United States Patent
Bühlmann

[19]

[11] Patent Number: 6,105,632
[45] Date of Patent: Aug. 22, 2000

[54] COMBINED PRESSURE REDUCING AND CHARGING VALVE

[75] Inventor: Pierre Bühlmann, Lidingö, Sweden

[73] Assignee: Interspiro, AB, Lidingo, Sweden

[21] Appl. No.: 09/180,583

[22] PCT Filed: May 20, 1997

[86] PCT No.: PCT/SE97/00821

§ 371 Date: Nov. 12, 1998

§ 102(e) Date: Nov. 12, 1998

[87] PCT Pub. No.: WO97/44093

PCT Pub. Date: Nov. 27, 1997

[30] Foreign Application Priority Data

May 21, 1996 [SE] Sweden .................................. 9601923

[51] Int. Cl.[7] ...................................................... B65B 1/04
[52] U.S. Cl. ............................................. 141/18; 141/197
[58] Field of Search .................................. 141/18, 2, 197, 141/20, 39, 44, 47, 51, 63; 137/495, 505.42

[56] References Cited

U.S. PATENT DOCUMENTS 5,048,565  9/1991  Oi .......................... 137/614.19
5,123,442  6/1992  Geuy et al. .............................. 137/495
5,186,209  2/1993  McManigal et al. ............... 137/505.18

FOREIGN PATENT DOCUMENTS 0 112 765 A1  of 1984  European Pat. Off. .
350 321       of 1972  Sweden .

*Primary Examiner*—Steven O. Douglas
*Attorney, Agent, or Firm*—Pollock, Vande Sande & Amernick

[57] ABSTRACT

A pressure reducing and filling valve combination for use in conjunction with gas bottles, particularly gas bottles that contain breathing gas under high pressure for use by underwater divers, firemen, etc. The valve includes a valve chamber and a spring-loaded valve slide movable in the valve chamber for reducing the pressure with the aid of the spring when gas is taken from the bottle for delivery to a part of the chamber. The pressure in this chamber part is held substantially constant at a level determined by the spring force. An external multi-purpose valve connector is adapted to connect the valve chamber to external equipment when gas is consumed. When filling the bottle with gas under high pressure, the valve delivers gas to the bottle via the same passageway as that through which gas was delivered to the valve chamber in response to gas consumption.

6 Claims, 2 Drawing Sheets

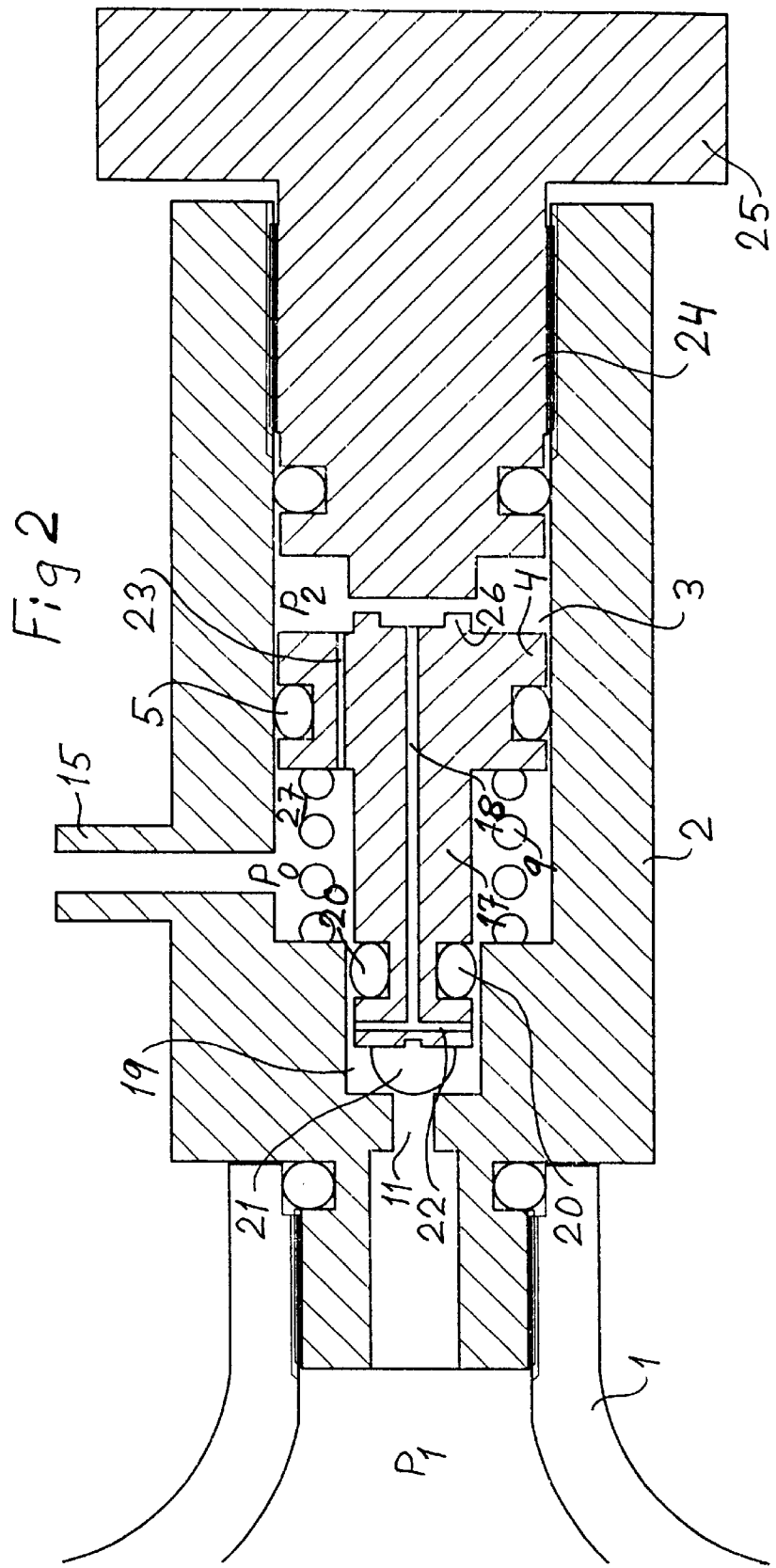

COMBINED PRESSURE REDUCING AND CHARGING VALVE

FIELD OF THE INVENTION

The present invention relates to a combined pressure reducing and filling valve for use in conjunction with gas bottles, and particularly with such bottles that contain breathing gas under high pressure for use by underwater divers, firemen, etc.

BACKGROUND OF THE INVENTION

The pressure bottles normally used by underwater divers and firemen, among others, typically contain breathing gas at a pressure of 200–300 bar. These gas bottles are equipped with a first pressure reduction valve which reduces the pressure delivered to the breathing equipment to a magnitude of 10 bar. EP-A1-0 112 765 discloses one example of such a pressure reduction valve. In addition to such a valve the gas bottles also include a so-called bottle valve by means of which the bottles can be re-filled with gas.

Although these two types of valves could physically be integrated into a single unit, the valves include two different valve seats with asssociated valve bodies, one for the pressure reduction valve and the other to the bottle valve. The bottles have also included two different external connections, the other for connecting breathing gas to the breathing equipment and one for connecting the bottle to an external gas source from which the bottle can be re-filled with fresh gas when so required.

The aforedescribed valve arrangement could be greatly simplified by enabling the bottle to be emptied and filled through one and the same connector while using one single valve seat and associated valve body. This would also constitute a significant improvement with regard to safety, since a valve of this nature would only include one sealing location that needs to be checked and maintained for safe functioning.

SUMMARY OF THE INVENTION

In accordance with the present invention there is provided a combined pressure reduction and filling valve of this kind which includes a common connection and a valve function which common for both purposes.

The present invention defines a combined pressure reduction and bottle-filling valve for use in conjunction with gas bottles, particularly bottles that contain highly pressurized breathing gas for underwater divers, firemen, etc., comprising a valve chamber and a spring-loaded valve slide which is movable in the valve chamber and which when gas is taken from the bottle and delivered to a part of the chamber functions to reduce the pressure with the aid of the spring, so as to maintain the pressure in the chamber part substantially constant at a level determined the force exerted by the spring; an outer multipurpose valve connector which when gas is consumed connects the valve chamber to external equipment and which when filling the bottle with highly pressurized gas delivers gas to the valve chamber; wherein the supplied gas pressure opens a bottle closing valve so that the bottle is filled with gas via the same passageway as that through which gas is delivered to the valve chamber as gas is consumed.

A valve according to the present invention can be manufactured and easily maintained, since it includes relatively few components. The valve has an added degree of safety against a malfunction of the valve, by virtue of having only one single valve seat. Use of the valve is also facilitated, since the valve includes only one connector which is used commonly in both bottle emptying and in bottle filling processes.

In one preferred embodiment of the invention, the spring acts on the valve slide to hold open the passageway from the bottle to the valve-chamber part until the pressure in this part of the chamber equals the force exerted by the spring.

In an embodiment of the invention, the passageway is normally held closed by a check valve which is actuated by the pressure in the bottle, and the valve slide is adapted to open the check valve under the influence of the spring when the pressure in the valve-chamber part lies below the set spring force.

The valve also conveniently includes means for latching the valve slide so as to prevent the slide from opening the check valve even when the pressure in the valve-chamber part is low. This function is utilized when the bottle shall be filled with fresh gas from an external source, among other things.

In another embodiment of the invention, the passageway is adapted to be closed by the valve slide against the action of the spring when the pressure in the valve-chamber part exceeds the set spring force. The valve is thus opened in a con-flow direction in this embodiment.

In this regard, the valve slide will preferably have the form of a piston that includes a part which is provided with a sealing body capable of closing the passageway. The piston-part includes means for conducting gas to the other side of the piston when the passageway is open, this gas exerting a force on the piston which causes the piston to move against the action of the spring so that the sealing body will close the passageway.

Both of the aforesaid embodiments will suitably include a nozzle mounted in the passageway between the external connection and the valve-chamber part in order to maintain an essentially constant gas flow through the connection as gas is being consumed. This is utilized, for example, when delivering gas to so-called rescue helmets.

Other characteristic features of the invention will be evident from the claims.

BRIEF DESCRIPTION OF THE DRAWINGS

The invention will now be described in more detail with reference to exemplifying embodiments thereof and also with reference to the accompanying drawings, wherein FIG. 2 is a longitudinal cross-sectional view of a valve combination according to a second embodiment of the present invention.

DETAILED DESCRIPTION OF THE PREFERRED EMBODIMENT(S)

Figure 1:
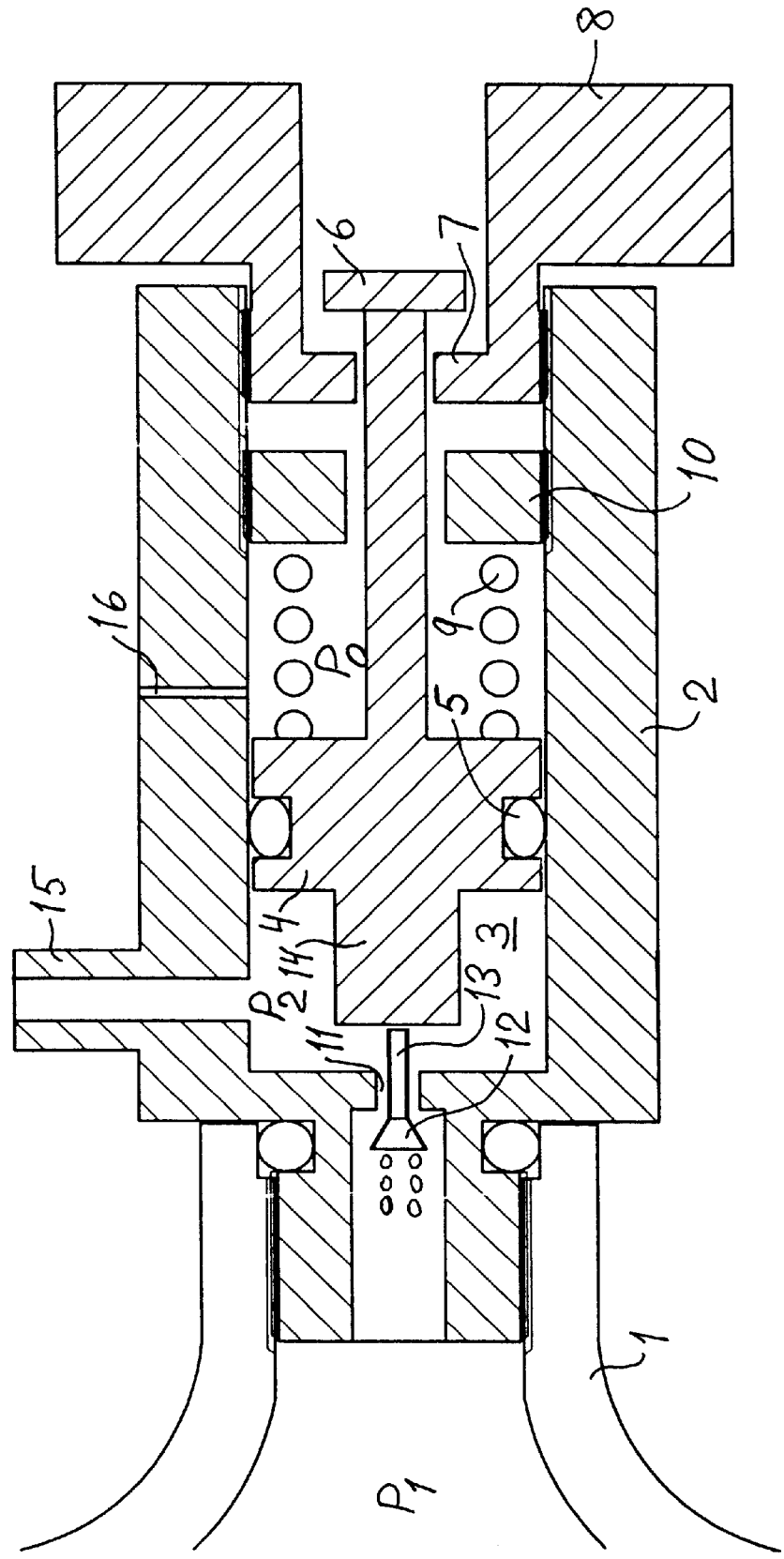
FIG. 1 is a longitudinal cross-sectional view of a valve combination in accordance with a first embodiment of the invention.

In FIG. 1, the reference numeral 1 identifies part of a breathing-gas bottle. A valve housing 2 is screwed into the bottle opening. The valve housing includes a valve chamber 3 and a valve slide 4 which is movable in an axial direction in the chamber and which includes a sealing O-ring 5. Forward movement of the valve slide, i.e. movement to the left in FIG. 1, is limited through the co-action of a rear slide-part 6 and an abutment surface 7 of a stop element 8 screwed into the valve housing 2. The stop element may be provided with a knob-shaped part. The slide 4 is acted upon by a pressure spring 9 which works between the slide and an adjuster 10 which is in screw engagement with the valve housing 2 so as to enable this element to be rotated for movement to the right or to the left in the Figure. The adjuster 10 functions to adjust the spring force acting on the valve slide 4.

The valve chamber 3 communicates with the interior of the bottle 1 via a gas passageway 11, which is normally held closed with the aid of a spring-loaded check valve 12. The check valve 12 has an outwardly projecting part 13 which co-acts with an outwardly projecting part 14 of the valve slide 4 so as to open the check valve 12.

The reference numeral 15 identifies an external connector by means of which the valve is connected, e.g., to breathing equipment or, alternatively, to a gas supply line through which the bottle 1 is filled with breathing gas under pressure from an external source. The reference numeral 16 identifies a channel which connects the space between the valve slide 4 and the adjuster 10 to the ambient atmosphere.

The above described valve operates as follows.

When the valve is connected to the bottle 1, which contains breathing gas at a high pressure $P_1$, e.g. 200–300 bar, the check valve 12 will close the passageway 11 and prevent gas from passing from the bottle. Breathing gas is supplied to the breathing equipment coupled to the external connector 15, by screwing the stop element 8 into the valve housing 2. This enables the spring 9 to force the valve slide 4 forwards, so that part 14 of the valve slide 4 will co-act with the part 13 of the check valve 12 and therewith open the valve. Gas will then flow into the valve chamber 3 and force back the slide 4 against the action of the spring 9, the valve 12 tending to re-close the passageway 11. The spring force can be adjusted, with the aid of the adjuster 10 to obtain a desired lower chamber pressure $P_2$, e.g. a presssure of 10 bar, this pressure being maintained in the valve chamber 3. As a result of the channel 16, the pressure on the other side of the valve slide 4 will correspond to atmospheric pressure $P_0$.

The pressure in the valve chamber 3 is thus held generally constant with the aid of the spring 9. When a nozzle is fitted to or mounted upstream of the connector 15, an essentially constant gas flow will be delivered to the breathing equipment, e.g. a rescue hood, coupled to the connector 15. When the bottle 1 is to be filled with fresh gas under high pressure, the stop element 8 is unscrewed slightly, wherewith the forwardly projecting part 14 of the slide 4 will move away from the part 13 of the check valve 12 and cause closure of the gas passageway 11. In this regard, the connector 15 may be coupled to a supply line extending from a high-pressure gas source. The rising gas pressure in the chamber 3 will open the check valve 12 and fill the bottle 1 to the desired pressure, whereafter the gas source is disconnected from the connector 15. The check valve 12 therewith again closes the passageway 11 and the valve is ready for a new function.

The described valve can be used very easily, since it includes only one external connection, this connection being used commonly both to empty and to fill the bottle 1. This reduces the risk of making a wrong connection. The valve can also be manufactured relatively easily, since it requires only one connection facility and one valve function for both emptying and filling the bottle 1. The use of one single valve function and one single valve seat also reduces the number of error sources and enhances safety.

FIG. 2 illustrates an alternative embodiment comprising a valve body 21 which closes the gas passageway 11 and which is opened in a conflow direction. Those parts which find correspondence in the FIG. 1 embodiment have been identified by the same reference signs.

In the FIG. 2 embodiment, the slide 4 has the form of a piston which includes a piston rod 17 and a through-passing passageway 18. The forward part of the piston rod 17 moves in a constricted part 19 of the valve chamber 3 and co-acts sealingly with the surface of part 19 via a sealing O-ring 20. The forward end of the piston rod carries the sealing body 21, which is able to close the gas passageway 11 when pressed against the orifice thereof. The channel 18 in the piston rod 17 communicates with the valve-chamber space located on the left of the O-ring 20 in the Figure, through a radial channel 22.

The reference numeral 23 identifies a channel which extends through the slide 4 and functions as a nozzle. The reference numeral 24 identifies a latch body which can be screwed into abutment with pins 26 projecting out from the valve slide 4, with the aid of a knob-like part 25. This prevents the body 22 from fully closing the channel 18.

The FIG. 2 embodiment operates in the following way.

When the connector 15 is connected to breathing equipment and the body 24 is in a retracted position, the spring 9 will force back the slide 4, to the right in FIG. 2, causing the sealing body 21 to open the gas passageway 11. Gas under pressure is thus able to flow through the passageway 11 and, via the radial channel 22 and the channel 18 in the piston rod 17, to the valve chamber 3 on the right side of the slide 4 in FIG. 2. When the chamber pressure has reached a level $P_2$ determined by the spring 9, the force exerted by the gas in the chamber 3 will move the valve 4 to the left in the Figure and therewith close the passageway 11. The pressure $P_2$ will thus be held essentially constant in the chamber 3, with the aid of the spring 9. This means that a substantially constant flow of gas will pass through the nozzle 23 and, via the connector 15, to the breathing equipment connected to the connector, in the same way as described with reference to FIG. 1.

The supply of gas can be throttled when desired, by screwing in the valve body 24, with the aid of the knob 25, so as to move the valve slide 4 and its piston rod 17 and thereby close the passageway 11 with the aid of the sealing body 21. For the purpose of filling the gas bottle 1 with fresh gas under pressure, a pressure line may be connected to the connector 15 and the body 24 unscrewed, or backed off, with the aid of the knob 25. The increased pressure in the chamber 27 will move the slide 4 to the right in the Figure, so that the sealing body 21 will open the passageway 11 and the O-ring 20 will be moved away from the wall of the chamber 19. Fresh gas under high pressure can therewith be delivered to the bottle 1 via the connector 15, the chamber 27, the chamber 19 and the passageway 11. When wishing to terminate a bottle filling operation, the body 24 is screwed into the valve housing 1 so as to press the piston rod 17 with the sealing body 21 against the inlet orifice of the passageway 11.

As with the earlier embodiment, there is also used in this embodiment a single connector 15 which is used commonly to both empty and fill the bottle 1, wherein the gas passes in both cases through the common passageway 11 which is regulated with the aid of one single sealing body 21.

Although the invention has been described above with reference to two embodiments thereof, it will be understood that these embodiments can be modified in several respects within the scope of the claims.

For instance, the illustrated pressure springs can be replaced with pull springs and placed on opposite sides of the valve slide. The form given to the valve slide can be varied as required. The spring function can also be achieved with other devices. Other types of pressure regulators may thus be used in accordance with the invention, which is primarily directed towards the use of one single connector and one single valve function for both emptying and filling of a pressure bottle or corresponding device.

What is claimed is:

1. A combined pressure reduction and bottle-filling valve for use with gas bottles containing highly pressurized breathing gas, the valve including a valve chamber and a spring-loaded valve slide movable in said valve chamber and which, when gas is taken from a bottle and delivered to a part of said valve chamber, reduces the pressure with the aid of the spring, so as to maintain the pressure in said valve chamber part substantially constant at a level determined by the force exerted by the spring, and an outer multi-purpose valve connector which, when gas is being consumed connects the valve chamber to external equipment and when filling the bottle with highly pressurized gas delivers gas to the bottle via the same passageway as that through which gas is delivered to the valve chamber as gas is consumed, wherein the spring actuates the valve slide so as to hold open the passageway extending from the bottle to said valve chamber part until the pressure in said valve chamber part reaches the level determined by the spring, and wherein a check valve maintains the passageway normally in a closed state under the influence of the pressure in the bottle and the valve slide is adapted to open said check valve under the influence of the spring when the pressure in said valve chamber part lies below the set spring pressure.

2. A valve according to claim 1, further comprising valve-slide latching means which prevent the check valve from opening even when the pressure in said part of said valve chamber is low.

3. A valve according to claim 1, wherein said check valve is adapted to open when a high pressure line is coupled to said connector for the purpose of filling the bottle.

4. A combined pressure reduction and bottle-filling valve for use with gas bottles containing highly pressurized breathing gas, the valve including a valve chamber and a spring-loaded valve slide movable in said valve chamber and which, when gas is taken from the bottle and delivered to a part of said valve chamber reduces the pressure with the aid of the spring, so as to maintain the pressure in said valve chamber part substantially constant at a level determined by the force exerted by the spring, and an outer multi-purpose valve connector which when gas is consumed connects the valve chamber to external equipment and when filling the bottle with highly pressurized gas delivers gas to the bottle via the same passageway as that through which gas is delivered to the valve chamber as gas is consumed, wherein the passageway is adapted to be closed by the valve slide against the action of said spring when the pressure in said valve-chamber part exceeds the set spring force and wherein the valve slide has the form of a piston that has a part which is provided with a sealing body capable to close the passageway, and the piston part includes means for conducting gas to the other side of the piston when said passageway is opened, said gas exerting a force on the piston and moving said piston against the action of the spring so that the sealing body closes the passageway.

5. A valve according to claim 4, wherein the piston-part carrying the sealing body is a hollow piston rod, the sealing body is provided on the outer end of the piston rod, the piston rod moves in a constricted part of the valve chamber and is provided with a sealing ring that co-acts with the wall of the constriction; and the piston rod includes a radial channel which communicates with the rod cavity and is located between the sealing body and the sealing ring.

6. A valve according to claim 4, wherein a nozzle is provided in the passageway between the outer valve connector and said valve-chamber part, said nozzle functioning to maintain a substantially constant flow through the connector as gas is consumed.

* * * * *